United States Patent
Kim et al.

(10) Patent No.: US 12,361,551 B2
(45) Date of Patent: *Jul. 15, 2025

(54) ARTIFICIAL NEURAL NETWORK-BASED IMAGE ANALYSIS APPARATUS AND METHOD FOR EVALUATING ANALYSIS RESULTS OF ARTIFICIAL NEURAL NETWORK

(71) Applicant: Coreline Soft Co., Ltd., Seoul (KR)

(72) Inventors: Jin Kook Kim, Seoul (KR); Jaeyoun Yi, Seoul (KR); Hyun Gi Seo, Goyang-si (KR); Donghoon Yu, Gimpo-si (KR)

(73) Assignee: Coreline Soft Co., Ltd., Seoul (KR)

( * ) Notice: Subject to any disclaimer, the term of this patent is extended or adjusted under 35 U.S.C. 154(b) by 36 days.

This patent is subject to a terminal disclaimer.

(21) Appl. No.: 18/334,617

(22) Filed: Jun. 14, 2023

(65) Prior Publication Data

US 2023/0342929 A1 Oct. 26, 2023

Related U.S. Application Data

(63) Continuation of application No. 16/896,790, filed on Jun. 9, 2020, now Pat. No. 11,715,198.

(30) Foreign Application Priority Data

Jul. 29, 2019 (KR) .................. 10-2019-0091525

(51) Int. Cl.
G06N 3/045 (2023.01)
G06T 7/00 (2017.01)
G06T 7/11 (2017.01)

(52) U.S. Cl.
CPC .......... G06T 7/0012 (2013.01); G06N 3/045 (2023.01); G06T 7/11 (2017.01);
(Continued)

(58) Field of Classification Search
CPC ................. G06N 3/045; G06N 3/08; G06T 2207/20081; G06T 2207/20084;
(Continued)

(56) References Cited

U.S. PATENT DOCUMENTS 9,536,054 B1 1/2017 Podilchuk et al.
9,773,305 B2 9/2017 Lee et al.
(Continued)

FOREIGN PATENT DOCUMENTS

KR 10-1818074 B1 1/2018
KR 10-2018-0040287 A 4/2018
(Continued)

*Primary Examiner* — Tsung Yin Tsai
(74) *Attorney, Agent, or Firm* — United One Law Group LLC; Kongsik Kim; Jhongwoo Peck

(57) ABSTRACT

Disclosed herein is an artificial neural network-based medical image analysis apparatus for analyzing a medical image based on a medical artificial neural network. The artificial neural network-based medical image analysis apparatus includes a computing system, and the computing system includes at least one processor. The at least one processor is configured to acquire or receive a first analysis result obtained through the inference of a first artificial neural network from a first medical image, to input the first analysis result to a second artificial neural network, to acquire a first evaluation result obtained through the inference of the second artificial neural network from the first analysis result, and to provide the first evaluation result to a user as an evaluation result for the first medical image and the first analysis result.

16 Claims, 10 Drawing Sheets

(52) U.S. Cl.
CPC ............... *G06T 2207/20081* (2013.01); *G06T 2207/20084* (2013.01); *G06T 2207/30048* (2013.01); *G06T 2207/30056* (2013.01); *G06T 2207/30061* (2013.01); *G06T 2207/30096* (2013.01)

(58) Field of Classification Search
CPC . G06T 2007/30048; G06T 2207/30056; G06T 2207/30061; G06T 2207/30096; G06T 7/0012; G06T 7/11
See application file for complete search history.

(56) References Cited

U.S. PATENT DOCUMENTS

| | | | |
|---|---|---|---|
| 10,474,917 | B2 | 11/2019 | Sharma et al. |
| 10,599,984 | B1* | 3/2020 | Wubbels ................ G16H 50/20 |
| 10,650,521 | B2 | 5/2020 | Battle et al. |
| 10,878,219 | B2 | 12/2020 | Zhou et al. |
| 11,715,198 | B2* | 8/2023 | Kim ...................... G06T 7/0012 382/156 |
| 2011/0007954 | A1 | 1/2011 | Suehling et al. |
| 2018/0286046 | A1* | 10/2018 | Battle .................... G16H 30/40 |
| 2019/0150857 | A1* | 5/2019 | Nye ....................... G16H 30/40 |
| 2019/0205606 | A1 | 7/2019 | Zhou et al. |
| 2019/0261945 | A1* | 8/2019 | Funka-Lea ............ G06T 15/205 |
| 2019/0371464 | A1 | 12/2019 | Kim et al. |
| 2020/0104720 | A1 | 4/2020 | Bao et al. |
| 2020/0258599 | A1 | 8/2020 | Clark et al. |
| 2020/0327449 | A1 | 10/2020 | Tiwari et al. |
| 2020/0334809 | A1 | 10/2020 | Vianu et al. |
| 2020/0401812 | A1* | 12/2020 | Cheng ................... G06V 40/113 |
| 2021/0035287 | A1* | 2/2021 | Kim ........................ G06N 3/08 |
| 2023/0342929 | A1* | 10/2023 | Kim ........................ G06N 3/08 |

FOREIGN PATENT DOCUMENTS

| | | |
|---|---|---|
| KR | 10-2018-0076504 A | 7/2018 |
| KR | 10-2018-0138107 A | 12/2018 |
| KR | 10-1929752 B1 | 12/2018 |
| KR | 10-1932008 B1 | 12/2018 |
| WO | 2018/015414 A1 | 1/2018 |

* cited by examiner

ARTIFICIAL NEURAL NETWORK-BASED IMAGE ANALYSIS APPARATUS AND METHOD FOR EVALUATING ANALYSIS RESULTS OF ARTIFICIAL NEURAL NETWORK

CROSS-REFERENCE TO RELATED APPLICATIONS

This application is a Continuation of application Ser. No. 16/896,790 filed on Jun. 9, 2020, which claims priority from Korean Application No. 10-2019-0091525 filed on Jul. 29, 2019. The aforementioned applications are incorporated herein by reference in their entireties.

TECHNICAL FIELD

The present invention relates generally to an apparatus and method for performing artificial neural network-based medical image analysis via an automated system. More particularly, the present invention relates to a method that generates additional information about an analysis result of a medical artificial neural network, provides the additional information to a user (including a radiologist and a clinician), and supports the analysis of a medical image, and also relates to an apparatus (a computing system) that performs the method.

The present invention was derived from the research conducted as part of the Electronic System Industry Core Technology R&D Project sponsored by the Korean Ministry of Trade, Industry and Energy and the Korea Evaluation Institute of Industrial Technology [Task Serial Number: 1415160865; Detailed Task Number: 10072064; and Project Name: Development of Artificial Intelligence Source Technology for Supporting Reading of Lung, Liver and Heart Disease Images and Commercialization Associated with PACS].

RELATED ART

Technology for segmenting or detecting an object in an image and classifying an object in an image are used for various purposes in image processing. In medical images, an object within an image is segmented, detected, and classified based on the brightness or intensity values of the image. In this case, the object may be an organ or lesion of the human body.

The recent introduction of a deep learning convolutional neural network (CNN) into the automation of an image processing process as an artificial neural network has dramatically improved the performance of an automatic image processing process.

Meanwhile, the insides of recent artificial neural networks such as a deep learning CNN are close to black boxes, and thus users have reluctance to fully accept and adopt them even though achieved results are excellent. In particular, the reluctance to the artificial neural networks is more significant in the field of medical imaging, which is a field that deals with human life.

Research into explainable artificial intelligence (X-AI) is being conducted by the Defense Advanced Research Projects Agency (DARPA) (https://www.darpa.mil/program/explainable-artificial-intelligence). However, there are no visible results yet.

The technology that generates a corrected diagnostic result by receiving user feedback on a result of the automatic diagnosis of a lesion of a medical image using an artificial neural network and correcting the automatic diagnostic result of the artificial neural network is disclosed in Korean Patent No. 10-1818074 entitled "Artificial Intelligence-Based Medical Automatic Diagnosis Support Method and System."

The technology that evaluates the validity of an automatic diagnostic result of a medical device by performing diagnosis on clinical data of the medical device using an artificial neural network and performing a statistical test on the diagnostic result is disclosed in Korean Patent No. 10-1929752 entitled "Method and System for Evaluating Clinical Validity of Medical Device based on Artificial Intelligence."

The prior arts of Korean Patent Nos. 10-1818074 and 10-1929752 are technologies for validating the automatic diagnostic result of the artificial neural network or for receiving feedback from a user and performing correction, and are intended to compensate for low reliability because the reliability of the automatic diagnostic result of the artificial neural network is not high. However, the prior art of Korean Patent No. 10-1818074 only provides a user interface that allows a user to modify, delete, or add a specific area of an automatic diagnostic result of the artificial neural network. The prior art of Korean Patent No. 10-1929752 is technology for obtaining a statistical match between an automatic diagnostic result of the artificial neural network and a diagnostic result of a human expert. Therefore, it is difficult to derive descriptive information about whether the automatic diagnostic result of the artificial neural network is reliable and why the automatic diagnostic result of the artificial neural network is reliable.

Meanwhile, the technology that segments, detects, classifies, and diagnoses complex types of lesions in the medical domain and selectively applies a plurality of segmentation algorithms is disclosed in International Publication No. WO 2018/015414 entitled "Method and System for Artificial Intelligence Based Medical Image Segmentation."

In the prior art document of International Publication No. WO 2018/015414, a technique for comparing pre-trained segmentation algorithms and selecting at least one from the segmentation algorithms is applied to acquire a final result of image segmentation. In this process, the concept of comparing and evaluating multiple segmentation algorithms is introduced.

However, even in the prior art document of International Publication No. WO 2018/015414, descriptive information (explanation) about criteria for the selective application of the segmentation algorithms cannot be derived. Accordingly, a problem arises in that it is difficult to increase a clinician or radiologist's reliability for the clinical usefulness of those segmentation techniques.

In the process of reading medical images, there is still a similar problem in that it is difficult to clinically rely on a process in which an artificial intelligence reading system, which operates entirely like a black box, acquires results.

SUMMARY

Recently, efforts have been made to improve performance of techniques for image segmentation, the detection of objects in images and classification by applying deep learning-based artificial intelligence techniques. However, the possibility of utilization of the deep learning-based artificial intelligence is limited in that the internal operation of the deep learning-based artificial intelligence is like a black box in connection with which a user does not know whether a result provided from an operation accidentally exhibits high performance or whether the result has been subjected to a judging process appropriate for a task.

In contrast, the use of training or learning using an easily explainable rule-based method is limited in that it does not achieve better performance than deep learning. Accordingly, research into deep learning-based artificial intelligence capable of providing descriptive information while providing improved performance is actively being conducted. In the fields of the practical application of image processing using artificial neural networks, especially in the medical imaging field, there is required descriptive information about the basis for analysis such as segmentation, diagnosis, and classification. In the prior arts, descriptive information has not yet been acquired.

In the prior art of Korean Patent No. 10-1818074, there are disclosed only the user interface adapted to allow a user to modify an automatic diagnostic result of an artificial neural network and a data format adapted to distinctively display modified information. Accordingly, it is impossible to know in advance whether an automatic diagnostic result of the artificial neural network is a valid diagnostic result until a human expert reviews the automatic diagnostic result.

In the prior art of Korean Patent No. 10-1929752, a diagnostic result of a human expert is acquired independently of an automatic diagnostic result of the artificial neural network, and then both the results are merely statistically validated by comparing them. Accordingly, it is impossible to know the evaluation of a human expert for the automatic diagnostic result of the artificial neural network itself.

Therefore, even if the prior arts of Korean Patent Nos. 10-1818074 and 10-1929752 are combined with each other, it is not possible to predict in advance an evaluation result of a human expert for an automatic diagnostic result of the artificial neural network. In addition, based on the prior arts, it is difficult to derive descriptive information about whether the automatic diagnostic result of the artificial neural network is reliable and why the automatic diagnostic result of the artificial neural network is reliable.

In the prior art document of International Publication No. WO 2018/015414, descriptive information about factors that affect the improvement of final segmentation performance cannot be derived. Even when a radiologist or clinician provides clinically meaningful feedback during a segmentation process, there is no way to check whether this feedback has actually been appropriately applied to the deep learning system.

An object of the present invention is to predict in advance an evaluation result of a human expert for an automatic analysis result of an artificial neural network. An object of the present invention is to predict whether an automatic analysis result of a first artificial neural network is valid through the inference of a second artificial neural network from the automatic analysis result of the first artificial neural network and provide predicted information about whether the automatic analysis result is valid, thereby improving the accuracy of a medical image analysis result finally adopted by a user.

According to an aspect of the present invention, there is provided an artificial neural network-based medical image analysis apparatus for analyzing a medical image based on a medical artificial neural network, the artificial neural network-based medical image analysis apparatus including a computing system, the computing system including at least one processor. The at least one processor is configured to acquire or receive a first analysis result obtained through the inference of a first artificial neural network from a first medical image, to input the first analysis result to a second artificial neural network, to acquire a first evaluation result obtained through the inference of the second artificial neural network from the first analysis result, and to provide the first evaluation result to a user as an evaluation result for the first medical image and the first analysis result.

In this case, the at least one processor may be further configured to offer a suggestion about whether to accept the first analysis result to the user based on the first evaluation result.

In this case, the second artificial neural network may be an artificial neural network that has learned the function of evaluating whether each of the plurality of second analysis results is valid by receiving expert's evaluations for a plurality of second analysis results generated through the inference of the first artificial neural network from a plurality of second medical images.

In this case, the first artificial neural network may provide at least one of image segmentation for the first medical image, clinical diagnosis for the first medical image, and a measurement of a segmented object in the first medical image as the first analysis result.

In this case, the at least one processor may be further configured to control the second artificial neural network so that the second artificial neural network extracts contextual information about the first analysis result, and to control the second artificial neural network so that the second artificial neural network outputs the first evaluation result evaluating the first analysis result based on the contextual information through inference. In this case, the contextual information may refer to information indicative of image segmentation, image diagnosis, a segmented region of interest, or the measurement of a lesion.

In this case, the at least one processor may be further configured to input both the first medical image and the first analysis result to the second artificial neural network, to control the second artificial neural network so that the second artificial neural network extracts contextual information about the first medical image, and to control the second artificial neural network so that the second artificial neural network outputs the first evaluation result evaluating the first analysis result for the first medical image based on the contextual information through inference. For example, when the second artificial neural network also receives the first medical image, the second artificial neural network may extract contextual information about the first medical image, and may output the first evaluation result for the first analysis result of the first artificial neural network. In this case, the second artificial neural network may be an artificial neural network that has learned the function of evaluating whether each of the plurality of second analysis results is valid by receiving expert's evaluations for a plurality of second analysis results generated through the inference of the first artificial neural network from a plurality of second medical images in advance.

In this case, the at least one processor may be further configured to display heatmap information based on internal parameters of the second artificial neural network outputting the first evaluation result by overlaying the heatmap information on the first medical image or first analysis result, and to provide the heatmap information to the user as descriptive information about a process in which the second artificial neural network outputs the first evaluation result.

In this case, the at least one processor may be further configured to visualize the first analysis result into a representative visualization form according to predetermined rules, and to provide the first analysis result, visualized into the representative visualization form, as an input to the second artificial neural network.

According to another aspect of the present invention, there is provided a training apparatus for a medical artificial neural network, the training apparatus including a computing system, the computing system including at least one processor. The at least one processor is configured to acquire or receive a plurality of second analysis results generated through the inference of a first artificial neural network from a plurality of second medical images, to acquire user input including expert's evaluations for the plurality of respective second analysis results, to input the plurality of second analysis results and the expert's evaluations for the plurality of second analysis results to a second artificial neural network, and to train the second artificial neural network so that the second artificial neural network learns the function of evaluating whether each of the plurality of second analysis results is valid.

In this case, the first artificial neural network may be an artificial neural network that provides one or more of image segmentation for each of the plurality of second medical images, clinical diagnosis for each of the plurality of second medical images, and the measurement of a segmented object in each of the plurality of second medical images as the plurality of second analysis results.

In this case, the at least one processor may be further configured to control the second artificial neural network so that the second artificial neural network extracts contextual information about each of the plurality of second analysis results, and to train the second artificial neural network so that the second artificial neural network learns correlations between the plurality of second analysis results and the expert's evaluations for the plurality of respective second analysis results based on the contextual information. In this case, the contextual information may refer to information indicative of image segmentation, image diagnosis, a segmented region of interest, or the measurement of a lesion.

In this case, the at least one processor may be further configured to input the plurality of second medical images, the second analysis results, and the expert's evaluations for the plurality of second analysis results to the second artificial neural network, to control the second artificial neural network so that the second artificial neural network extracts contextual information for each of the plurality of second medical images, and to train the second artificial neural network so that the second artificial neural network learns correlations between the second analysis results for the plurality of second medical images and the expert's evaluations for the plurality of second analysis results based on the contextual information.

In this case, the at least one processor may be further configured to generate heatmap information based on internal parameters of the second artificial neural network in a training process for the learning of each of the plurality of second analysis results, to display the heatmap information by overlaying the heatmap information on each of the plurality of second medical images or each of the plurality of second analysis results, and to provide the heatmap information to a user as descriptive information about the training process of the second artificial neural network.

In this case, the at least one processor may be further configured to visualize each of the plurality of second analysis results into a representative visualization form according to predetermined rules, and to provide each of the plurality of second analysis results, visualized into the representative visualization form, as an input to the second artificial neural network.

According to another aspect of the present invention, there is provided an artificial neural network-based medical image analysis method, the artificial neural network-based medical image analysis method being performed by program instructions executed by a computing system, the artificial neural network-based medical image analysis method including: acquiring or receiving a first analysis result obtained through the inference of a first artificial neural network from a first medical image; inputting the first analysis result to a second artificial neural network; acquiring a first evaluation result obtained through the inference of the second artificial neural network from the first analysis result; and providing the first evaluation result to a user as an evaluation result for the first medical image and the first analysis result.

According to still another aspect of the present invention, there is provided a training method for a medical artificial neural network, the training method being performed by program instructions executed by a computing system, the training method including: acquiring or receiving a plurality of second analysis results generated through the inference of a first artificial neural network from a plurality of second medical images; acquiring user input including expert's evaluations for the plurality of respective second analysis results; inputting the plurality of second analysis results and the expert's evaluations for the plurality of second analysis results to a second artificial neural network; and training the second artificial neural network so that the second artificial neural network learns the function of evaluating whether each of the plurality of second analysis results is valid.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
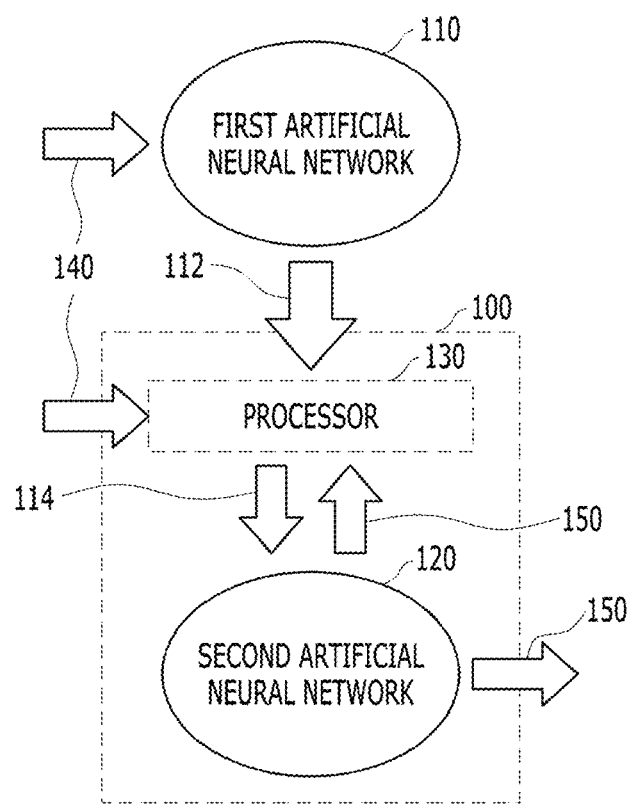
FIG. 1 is a diagram showing a medical image analysis apparatus based on a medical artificial neural network according to an embodiment of the present invention.

Other objects and features of the present invention in addition to the above object will be apparent from the following description of embodiments with reference to the accompanying drawings.

Embodiments of the present invention will be described in detail below with reference to the accompanying drawings. In the following description, when it is determined that a detailed description of a related known component or function may unnecessarily make the gist of the present invention obscure, it will be omitted.

Deep learning/CNN-based artificial neural network technology, which has recently developed rapidly, is considered for the purpose of identifying a visual element that is difficult to identify with the human eye when it is applied to the imaging field. The field of application of the above technology is expected to expand to various fields such as security, medical imaging, and non-destructive testing.

For example, in the medical imaging field, there are cases where a tissue in question is not immediately diagnosed as a cancer tissue in a biopsy state but whether it is a cancer tissue is determined only after being monitored from a pathological point of view. Although it is difficult to confirm whether a corresponding cell is a cancer tissue in a medical image with the human eye, there is an expectation that the application of artificial neural network technology may acquire more accurate prediction results than observation with the human eye.

However, even when the artificial neural network technology can acquire more desirable prediction/classification/reading (diagnosis) results than the human eye in some studies, a problem arises in that it is difficult to accept and adopt them in the medical field due to lack of descriptive information about the prediction/classification/reading (diagnosis) results acquired by applying the artificial neural network technology.

The present invention has been conceived based on the intention of improving the performance of classifying/predicting objects in images, which are difficult to classify with the human eye, by applying artificial neural network technology. Furthermore, in order to improve the classification/prediction performance of the artificial neural network technology, it is very important to acquire descriptive information about an internal operation based on the classification/prediction process of the artificial neural network technology that reaches the generation of a final reading result.

The present invention may provide the performance indices and clinical usefulness of a plurality of medical image reading algorithms based on artificial neural networks as quantified indices. Accordingly, it may be possible to provide descriptive information about the process of deriving a final read result based on the classification/prediction process of the artificial neural network, and there may be provided a reference for whether a human user will adopt the classification/prediction/reading (support) result of the artificial neural network.

When the prior art artificial neural network is applied to the reading/diagnosis of medical images, there are cases where it is overfit only to a given data range in a given task, so that statistical accuracy is high but accuracy is low in some clinically important diagnostic points. A number of prior art artificial neural networks are placed in this situation, and this frequently results in a situation in which it is difficult for clinicians to rely on medical image reading/diagnosing results to which artificial neural networks are applied. This risk is more obvious in that IBM's Watson Solution, i.e., a well-known artificial neural network, is exposed to a problem in which it is overfit to the race information of patients included in learned data, and thus the accuracy thereof is significantly low for the dataset of patients of a new race.

Therefore, it is very important to provide quantified indices as to whether clinicians will accept these reading/diagnostic results while making the best use of the excellent reading/diagnostic potential of artificial neural networks and also to provide a route through which clinicians can provide direct feedback on the generation of the quantified indices.

In particular, the prior art artificial neural networks exhibit excellent performance in the analysis and classification of medical images, but they are overfit to an insignificant factor from the point of view of human experts, thereby reducing clinical usefulness. Therefore, when an evaluation result into which the point of view of human experts for the analysis result of the prior art artificial neural network can be accurately incorporated can be provided using a separate artificial neural network, the evaluation result can be used as descriptive information that can increase the clinical usefulness of the analysis result of the prior art artificial neural network.

FIG. 1 is a diagram showing a medical image analysis apparatus based on a medical artificial neural network according to an embodiment of the present invention.

Referring to FIG. 1, the medical image analysis apparatus based on a medical artificial neural network according to the present embodiment includes a computing system 100, and the computing system 100 includes at least one processor 130. The at least one processor 130 acquires or receives a first analysis result 112 obtained through the inference of a first artificial neural network 110 from a first medical image 140, inputs the first analysis result 112 to a second artificial neural network 120 (see an input 114), acquires a first evaluation result 150 obtained through the inference of the second artificial neural network 120 from the first analysis result 112, and provides the first evaluation result 150 to a user as an evaluation result for the first medical image 140 and the first analysis result 112.

In this case, the at least one processor 130 may offer a suggestion about whether to accept the first analysis result 112 to the user based on the first evaluation result 150.

In this case, the second artificial neural network 120 may be an artificial neural network that has learned the function of evaluating whether each of the plurality of second analysis results is valid upon receiving expert's evaluations for a plurality of second analysis results generated through the inference of the first artificial neural network 110 from a plurality of second medical images.

In this case, the first artificial neural network 110 may provide at least one of image segmentation for the first medical image 140, clinical diagnosis, and a measurement of a segmented object in the first medical image 140 as the first analysis result 112.

In this case, the at least one processor 130 may control the second artificial neural network 120 so that the second artificial neural network 120 extracts contextual information about the first analysis result 112. Furthermore, the at least one processor 130 may control the second artificial neural network 120 so that the second artificial neural network 120 outputs the first evaluation result 150 evaluating the first analysis result 112 based on the contextual information through inference. In this case, the contextual information may refer to information indicative of image segmentation, an image diagnosis, a segmented region of interest, or a measurement of a lesion. An example of the contextual information may be information indicative of lobe segmentation, airway segmentation or airway measurement for a lung. The second artificial neural network 120 may be trained for an integrated task in an integrated manner, in which case the second artificial neural network 120 may identify a given task based on contextual information and derive an evaluation result appropriate for the identified task.

In this case, the at least one processor 130 may input the first analysis result 112 to the second artificial neural network 120 without change. In another embodiment, the at least one processor 130 may receive the first medical image 140, and may input both the first medical image 140 and the first analysis result 112 to the second artificial neural network 120. In this case, the at least one processor 130 may control the second artificial neural network 120 so that the second artificial neural network 120 extracts contextual information about the first medical image 140. Furthermore, the at least one processor 130 may control the second artificial neural network 120 so that the second artificial neural network 120 outputs the first evaluation result 150 evaluating the first analysis result 112 for the first medical image 140 based on the contextual information through inference. For example, when the second artificial neural network 120 also receives the first medical image 140, the second artificial neural network 120 may extract contextual information about the first medical image 140, and may output the first evaluation result 150 for the first analysis result 112 of the first artificial neural network 110. In this case, the second artificial neural network 120 may be an artificial neural network that has learned the functions of receiving expert evaluations for a plurality of second analysis results, generated through the inference of the first artificial neural network 110 from a plurality of second medical images, in advance and evaluating whether the plurality of second analysis results is valid. Even in a learning process, the second artificial neural network 120 may extract contextual information about each of a plurality of second analysis results and each of a plurality of second medical images. In the second artificial neural network 120, the contextual information may serve as criteria for classifying a process of learning evaluation results for the plurality of second analysis results 212 for each classified task.

In this case, the at least one processor 130 may display heatmap information based on internal parameters of the second artificial neural network 120 outputting the first evaluation result 150 by overlaying the heatmap information on the first medical image 140 or first analysis result 112, and may provide the heatmap information to the user as descriptive information about a process in which the second artificial neural network 120 outputs the first evaluation result 150. The heatmap information may be provided as the basis on which the second artificial neural network 120 derives the first evaluation result 150 for the first analysis result 112. In other words, the features chiefly extracted when the second artificial neural network 120 derives the first evaluation result 150 are represented in the form of a heatmap, and thus it may also be used as a basis for the indication of the level of reliability of the second artificial neural network 120 itself whether the items that are chiefly examined by a human expert when he is she evaluates automatic analysis results of the first artificial neural network 110 and the heat map of the second artificial neural network 120 generally coincide with each other. Furthermore, when the features chiefly extracted when the second artificial neural network 120 derives the first evaluation result 150 are identified as a heatmap, this may also be used as a basis for the validation of the evaluation points, which may be missed by human experts, using the second artificial neural network 120. Moreover, the heatmap information is the basis on which the second artificial neural network 120 derives the first evaluation result 150, and thus the heatmap information may be used to improve the analysis performance of first artificial neural network 110 in the future.

In this case, the at least one processor 130 may visualize the first analysis result 112 into a representative visualization form according to predetermined rules, and may provide the first analysis result 112, visualized into the representative visualization form, as an input 114 to the second artificial neural network 120. In this case, the representative visualization form refers to "a form and/or view that can be read or interpreted by a human expert" or "a form and/or view that is chiefly used by a human expert when he or she performs reading or interpretation," and may be determined based on a pattern analyzed and extracted by the computing system 100 according to the predetermined rules. A form and/or view may include Sagittal view, Coronal view, Axial view, 3D Volume rendered view, Surface rendered view, transparent or semi-transparent view, Reformatted view, Planar view or 3D prospective view. For example, a result obtained by a human expert evaluating the analysis result of the first artificial neural network 110 may be used for the learning of the second artificial neural network 120. In this case, in order for a human expert to evaluate the analysis result of the first artificial neural network 110, the analysis result of the first artificial neural network 110 may be overlaid on the medical image, or visualization may be performed such that the medical image can be compared with the analysis result of the first artificial neural network 110. Furthermore, the medical image may be visualized in a special form, and then visualization may be performed such that the medical image can be compared with the analysis result of the first artificial neural network 110 or the analysis result of the first artificial neural network 110 may be overlaid on the medical image visualized in a special form. The computing system 100 and the processor 130 may track, analyze, and pattern a visualization option/visualization form that is adopted for a human expert to evaluate the analysis result of the first artificial neural network 110. This patterned visualization option/visualization form may be named a representative visualization form. Meanwhile, the representative visualization form may be subdivided to fit the subdivided tasks based on the context information described above.

In other words, this process may be performed by the at least one processor 130 in the computing system 100 according to the predetermined rules. However, the predetermined rules are obtained in such a manner that the computing system 100 extracts the most representative visualization forms by monitoring a process in which a user who is a human expert evaluates analysis results of the first artificial neural network 110 and the predetermined rules are derived and defined using the extracted visualization forms.

In other words, when the first analysis result 112 of the first artificial neural network 110 is provided as an input to the second artificial neural network 120 by the processor 130, the first analysis result 112 may not be input without change, but the first analysis result 112 may be visualized in a representative visualization form specifically classified based on contextual information, and may then be provided as an input 114 to the second artificial neural network 120. This representative visualization form may be standardized and applied even when the second artificial neural network 120 learns second analysis results for a plurality of second medical images together with the evaluation results of human experts.

Although the prior arts incorporate the evaluation results of human experts into clinical diagnosis using an artificial neural network, the prior art of Korean Patent No. 10-1818074 discloses only data formats capable of showing information modified by a human expert, and do not propose separate evaluation criteria for the automatic diagnostic results of the artificial neural network. In the prior art of Korean Patent No. 10-1929752, the diagnostic result of a human expert is derived independently of the automatic diagnostic result of an artificial neural network, and the results are statistically validated by comparing them. Accordingly, there is not disposed a method of checking the evaluation of a human expert for the automatic diagnostic result of the artificial neural network.

Although other prior arts incorporate the evaluation or feedback of a human expert into an automatic diagnostic result of an artificial neural network, there are technologies in which evaluation or feedback is fused as part of the configuration of an artificial neural network and there is presented a new automatic diagnostic result in which evaluation or feedback indices are incorporated into a conventional artificial neural network computer-aided diagnosis (CAD) model.

In these prior arts, "various types of different information" are added to an automatic diagnostic result of the artificial neural network in an integrated manner. In other words, the artificial neural network model configured to generate evaluation indices (indices into which an evaluation result of a human expert is incorporated) receives many types of additional clinical diagnostic information in addition to an automatic diagnostic result of the conventional CAD artificial neural network model. In this case, the input data of the prior art artificial neural network model configured to generate evaluation indices becomes very complicated. The input data of the prior art artificial neural network model configured to generate evaluation indices does not have a simple form understandable by a human, and thus the process of generating evaluation indices cannot be intuitively understood or validated by a human. In other words, the prior arts make the best use of the features of the deep learning structure of the artificial neural network as much as possible, and may be viewed as technologies for solving a part that cannot be understood or recognized by a human by entrusting the part to the configuration of the deep artificial neural network.

These prior art artificial neural networks provide better performance than human cognition or judgment in some domains, but there is no means for the human acceptance or validation of analysis results. Although the prior arts also provide evaluation indices for analysis results, it is pointed out that the process of generating the evaluation indices is very difficult for a human to accept or validate.

The present invention relies only on the analysis of the first artificial neural network 110 for an original medical image, and the second artificial neural network 120 does not need to perform any operation on the original medical image. However, in this process, in order to match the evaluation operation of the second artificial neural network 120 against the evaluation operation performed by a human, the analysis result of the first artificial neural network 110 may be combined with the original medical image, or visualization may be performed based on the original medical image and a visualization result may be provided as an input 114 to the second artificial neural network 120.

In the present embodiment, the second artificial neural network 120 completely independent of the first artificial neural network 110 is trained to the process of evaluating the analysis result of the first artificial neural network 110, the second artificial neural network 120 instead of a human expert may evaluate the analysis result of the first artificial neural network 110. This is different from the tendency for the prior arts to incorporate evaluation for the diagnostic result of the first artificial neural network 110 and to derive a new diagnostic result, into which the evaluation of a human expert has been incorporated, via the fusion artificial neural network model.

In other words, in the prior arts, the fusion artificial neural network model derives the new diagnostic result into which an expert evaluation for the diagnostic result of the first artificial neural network 110 has been incorporated. Accordingly, it is difficult for an external user to be aware of the evaluation itself for the diagnostic result of the first artificial neural network 110, and it is also difficult for an external user to be aware of a point in the diagnostic result of the first artificial neural network 110 that plays an important role in the evaluation.

In the present embodiment, the second artificial neural network 120 completely independent of the first artificial neural network 110 may derive an evaluation result for the analysis result of the first artificial neural network 110, so that the evaluation result may be provided to the external user as descriptive information about the analysis result of the first artificial neural network 110, and may be a basis for the provision of the reliability of the user, who is a human expert, to clinical usefulness for the analysis result of the first artificial neural network 110.

Figure 2:
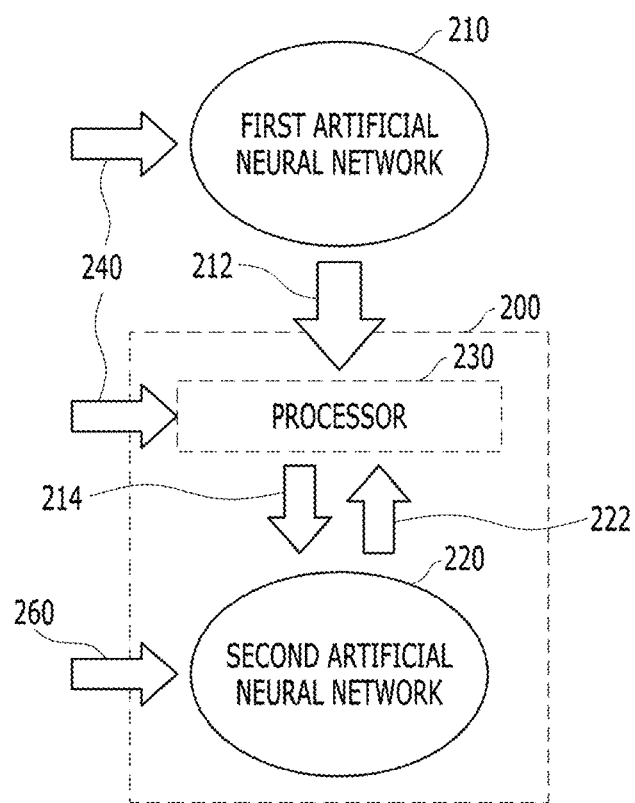
FIG. 2 is a diagram showing a training apparatus for a medical artificial neural network according to an embodiment of the present invention.

FIG. 2 is a diagram showing a training apparatus for a medical artificial neural network according to an embodiment of the present invention.

Referring to FIG. 2, the training apparatus for a medical artificial neural network according to the present embodiment includes a computing system 200, and the computing system 200 includes at least one processor 230. The at least one processor 230 acquires or receives a plurality of second analysis results 212 generated through the inference of a first artificial neural network 210 from a plurality of second medical images 240, acquires user input including expert evaluations 216 for the plurality of respective second analysis results 212, inputs the plurality of second analysis results 212 and the expert evaluations 216 for the plurality of second analysis results 212 to a second artificial neural network 220, and trains the second artificial neural network 220 so that the second artificial neural network 220 learns the function of evaluating whether each of the plurality of second analysis results 212 is valid. The second artificial neural network 220 may receive the second analysis results 212 and the expert evaluations 216 as input and output a function value 222 obtained through the internal operation of the second artificial neural network 220 to transfer the function value 222 to the processor 230, and the processor 230 may determine whether to continue to train the second artificial neural network 220 based on the function value 222.

In this case, the first artificial neural network 210 may be an artificial neural network that provides one or more of image segmentation for each of the plurality of second medical images 240, clinical diagnosis, and a measurement of a segmented object in each of the plurality of second medical images 240 as the plurality of second analysis results 212.

In this case, the at least one processor 230 may control the second artificial neural network 220 so that the second artificial neural network 220 extracts contextual information about each of the plurality of second analysis results 212, and may train the second artificial neural network 220 so that the second artificial neural network 220 learns correlations between the plurality of second analysis results 212 and the expert evaluations 216 for the plurality of respective second analysis results 212 based on the contextual information. In this case, the contextual information may refer to information indicative of image segmentation, an image diagnosis, a segmented region of interest, or a measurement of a lesion. An example of the contextual information may be information indicative of lobe segmentation, airway segmentation or airway measurement for a lung. The second artificial neural network 220 may be trained for an integrated task in an integrated manner, in which case the second artificial neural network 220 may identify a given task based on contextual information and derive evaluation results appropriate for the identified task.

In this case, the at least one processor 230 may input the second analysis results 212 to the second artificial neural network 220. In another embodiment of the present invention, the at least one processor 230 may input the plurality of second medical images 240, the second analysis results 212, and the expert evaluations 216 for the plurality of second analysis results 212 to the second artificial neural network 220. In this case, the at least one processor 230 may control the second artificial neural network 220 so that the second artificial neural network 220 extracts contextual information for each of the plurality of second medical images 240. Furthermore, the at least one processor 230 may train the second artificial neural network 220 so that the second artificial neural network 220 learns correlations between the second analysis results 212 for the plurality of second medical images 240 and the expert evaluations 216 for the plurality of second analysis results 212 based on the contextual information. In the second artificial neural network 220, the contextual information may serve as criteria for classifying a process of learning evaluation results for the plurality of second analysis results 212 for each classified task.

In this case, the at least one processor 230 may generate heatmap information based on internal parameters of the second artificial neural network 220 in a training process for the learning of each of the plurality of second analysis results 212, may display the heatmap information by overlaying the heatmap information on each of the plurality of second medical images 240 or each of the plurality of second analysis results 212, and may provide the heatmap information to a user as descriptive information about the training process of the second artificial neural network 220. The heatmap information may be used as a basis for the description of the evaluation results of the second artificial neural network 220. The heatmap information may be used as a medical staff, such as a radiologist or clinician, in order to improve the reliability of the medical staff for the evaluation results of the second artificial neural network 220, or may be used as a basis for the cross validation of a medical staff for the evaluation results of the second artificial neural network 220 or as a basis on which a medical staff accepts an important diagnostic point that is difficult for a human expert to discover through the evaluation results of the second artificial neural network 220. The heatmap information may be used as useful information for software and artificial intelligence experts who develop the second artificial neural network 220. The developer may determine whether the operation of the second artificial neural network 220 is smooth or whether the second artificial neural network 220 is appropriately focusing on a clinically meaningful visual element based on the distribution of the heatmap.

In this case, the at least one processor 230 may visualize each of the plurality of second analysis results 212 into a representative visualization form according to predetermined rules, and may provide each of the plurality of second analysis results 212, visualized into the representative visualization form, as an input 214 to the second artificial neural network 220.

The computing system 200 of the present invention receives feedback on the expert evaluations for the analysis results (at least one of clinical diagnosis, image segmentation, and measurement results) of the first artificial neural network 210, and performs control so that the analysis results of the first artificial neural network 210 and the expert evaluations are provided as inputs to the second artificial neural network 220 and the second artificial neural network 220 learns expert evaluations for the analysis results of the first artificial neural network 210. It will be prescribed by the internal network parameters of the second artificial neural network 220 through the learning of the second artificial neural network 220 to determine detailed points in the analysis results of the first artificial neural network 210 that play important roles in the expert evaluations.

In this process, the learning of the second artificial neural network 220 is performed based on training images including all of visualization forms, visualization elements, display screens, the analysis results of the first artificial neural network 210 displayed on the display screens, and the display forms of original medical images that are chiefly used when a user who is a human expert evaluates the analysis results of the first artificial neural network 210. Accordingly, the learning process of the second artificial neural network 220 will provide the most similar results to those in the process of evaluating the analysis results of the first artificial neural network 210 performed by the user who is a human expert. In this process, in the process of evaluating the analysis results of the first artificial neural network 210, a detailed index or the like that is not recognized by a human but plays an important role in evaluation will be extracted and learned through the learning of the second artificial neural network 220.

The computing system 200 of the present invention is most advantageous in that the computing system 200 completely separates the second artificial neural network 220 from the first artificial neural network 210 and uses the second artificial neural network 220 operating completely independently of the first artificial neural network 210, thereby enabling the analysis results of the first artificial neural network 210 to be evaluated in "a form that is easy to describe to a user who is a human expert." In this case, for the purpose of the leaning and training of the second artificial neural network 220, the analysis results of the first artificial neural network 210 are given in "a form that can be interpreted by a user who is a human expert," and there is received the expert feedback of the user, who is a human expert, on the analysis results given in the form that can be interpreted by a user who is a human expert. Inputs to the inference process of the second artificial neural network 220 are the analysis results of the first artificial neural network 210, i.e., the analysis results provided in "a form that can be interpreted by a user who is a human expert," and inputs to the training process of the second artificial neural network 220 are the analysis results of the first artificial neural network 210, i.e., the analysis results provided in "a form that can be interpreted by a user who is a human expert," and the human expert evaluations 216 for the analysis results.

In this case, the form that can be interpreted by a user who is a human expert refers to a form in which the analysis results of the first artificial neural network 210 are overlaid on medical images, or a form in which the analysis results of the first artificial neural network 210 have been reprocessed to be visualized such that the user who is a human expert may use the analysis results for diagnosis. In an embodiment of the present invention, when a user executes a command to combine or synchronize the analysis results of the first artificial neural network 210 with other views of the medical images and perform comparison in order to validate the analysis results of the first artificial neural network 210, the computing system of the present invention 200 may collect and analyze the command of the user to derive a representative visualization type used by the user to validate the analysis results of the first artificial neural network 210.

For example, when the analysis results of the first artificial neural network 210 are described as a mask for the diagnosis of a lesion or image segmentation, it may be a general routine for a user, who is a human expert, to overlay the mask on the medical images and perform comparison. In this case, the mask that is the analysis results of the first artificial neural network 210 is not input to the second artificial neural network 220 without change, but images in which the mask that is the analysis results of the first artificial neural network 210 are overlaid on the medical images according to predetermined rules are provided as inputs 214. In this case, the type of medical images that are received by the first artificial neural network 210 for the purpose of analysis and the type of medical images on which the mask is overlaid for the purpose of input to the second artificial neural network 220 may be the same as or different from each other. Furthermore, the view of the medical images that are received by the first artificial neural network 210 for the purpose of analysis and the view of the medical images on which the mask is overlaid for the purpose of input to the second artificial neural network 220 may be the same as or different from each other.

Referring to FIGS. 1 and 2 together, the features of the present invention may be described as follows. In the embodiments of the present invention, the first artificial neural networks 110 and 210 (in charge of an image analysis function) are separated from the second artificial neural networks 120 and 220 that perform evaluation only. In this case, the second artificial neural networks 120 and 220 are optimized only for an evaluation function, and thus the level of concentration on a given task is high. When the second artificial neural networks 120 and 220 evaluate the analysis results obtained by the first artificial neural networks 110 and 210, the new CAD model in which CAD diagnosis and evaluation indices are fused together is derived in the case of the prior arts. Accordingly, detailed functions, such as elements or points in CAD diagnosis, that contribute to the generation of evaluation indices are not clearly identified, and the analysis of the validity of the evaluation (the generation of evaluation indices) of the diagnostic results of a CAD diagnosis module is not easy. The first artificial neural networks 110 and 210 are separated from the second artificial neural networks 120 and 220, so that the second artificial neural networks 120 and 220 may intensively extract factors important in expert evaluation, and it may be possible to effectively extract important factors for the evaluation of diagnosis/segmentation/measurement results without affecting the accuracy of CAD diagnostic results (or segmentation/measurement results) itself.

In the analysis of causes such as information about whether the analysis results of the first artificial neural networks 110 and 210 have not been overfit to a specific data set and the reason why the analysis results of the first artificial neural networks 110 and 210 are not highly evaluated, it is advantageous for the second artificial neural networks 120 and 220 separated from the first artificial neural networks 110 and 210 to independently learn the evaluation function.

Furthermore, in the present invention, data input to the second artificial neural networks 120 and 220 may be standardized in a simple form. The input data is only the analysis results of the first artificial neural networks 110 and 210 and expert evaluations for the analysis results. In an embodiment of the present invention, the analysis results of the first artificial neural networks 110 and 210 and the expert evaluations may be displayed in combination with the representative visualization form of the original medical images. Factors, such as the degree to which the expert evaluations match each other and the points of the analysis results of the artificial neural network on which the expert evaluations focus, are derived through the learning process of the second artificial neural networks 120 and 220. While the degree of freedom of analysis of the second artificial neural networks 120 and 220 is increased, a task given is made simple and clear. Meanwhile, the second artificial neural networks 120 and 220 are separated from the first artificial neural networks 110 and 210 so that the second artificial neural networks 120 and 220 do not need to redo an analysis process itself. This allows a learning process to be performed rapidly, and also allows the second artificial neural networks 120 and 220 to concentrate upon a given task. The process of generating the analysis results of the first artificial neural networks 110 and 210 and the process in which the second artificial neural networks 120 and 220 evaluate the analysis results of the first artificial neural networks 110 and 210 may be clearly separated from each other and do not affect each other. The second artificial neural networks 120 and 220 may provide descriptive information about the operation and characteristics of the first artificial neural networks 110 and 210. Unlike in the configuration in which the evaluation module of the prior art (evaluation index generation model) is combined with the first artificial neural networks 110 and 210, factors that are important in the evaluation process may be extracted independently from the analysis results of the first artificial neural networks 110 and 210. This point makes it easier to acquire descriptive information that qualitatively describes what is important in evaluating the analysis results of the first artificial neural networks 110 and 210 from the point of view of an end user. In other words, the end user may be provided with information optimized to describe whether to accept the analysis results of the first artificial neural networks 110 and 210.

Meanwhile, the developers of the first artificial neural networks 110 and 210 may be also provided with information that qualitatively describes the points required to be further improved in order for the analysis results of the first artificial neural networks 110 and 210 to receive high evaluation and user adoption. In other words, there may be provided information optimized to describe the points of the first artificial neural networks 110 and 210 that are required to be improved.

Meanwhile, in the present invention, the first artificial neural networks 110 and 210 and the second artificial neural networks 120 and 220 are separated from each other. Accordingly, any domain may be a learning target of the second artificial neural networks 120 and 220 as long as a human expert can evaluate the analysis results derived by the first artificial neural networks 110 and 210 in the domain. For example, in the prior arts, chiefly, CAD, i.e., an artificial neural network used to detect and diagnose a lesion is a target to which evaluation is applied. In contrast, the domain to which the present invention is applied may be expanded. For example, not only the segmentation of an image and the detection of a lesion in an image but also the measurement of a specific region of interest segmented through segmentation of an image may be evaluation targets of the second artificial neural networks 120 and 220 of the present invention. Accordingly, the second artificial neural networks 120 and 220 of the present invention may perform mixed learning for various tasks, and may extract context information, identify a task (e.g., segmentation, diagnosis, or measurement), and perform evaluation appropriate for a corresponding class.

Figure 3:
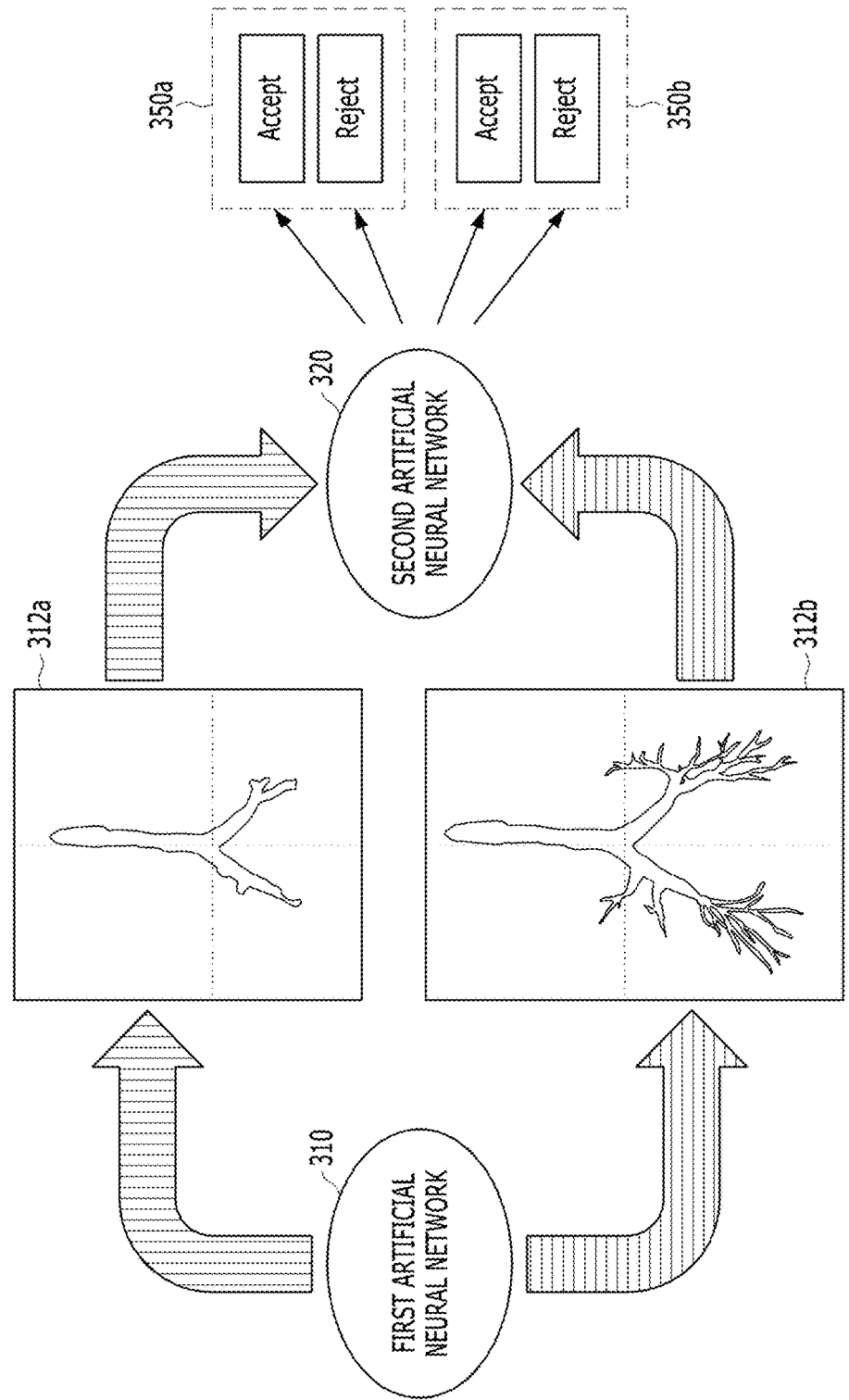
FIG. 3 is a diagram showing an artificial neural network-based medical image analysis process according to an embodiment of the present invention.

FIG. 3 is a diagram showing an artificial neural network-based medical image analysis process according to an embodiment of the present invention.

The first artificial neural network 310 may perform inference on an input image, and may output analysis results 312*a* and 312*b*. A processor (not shown in FIG. 3) may input the analysis results 312*a* and 312*b* to a second artificial neural network 320. In this case, the second artificial neural network 320 may be constructed independently of the first artificial neural network 310, and may derive evaluation results 350*a* and 350*b* for the analysis results 312*a* and 312*b*. The evaluation result 350*a* for the analysis result 312*a* is derived as a result inferred by predicting whether a human expert will accept or reject the analysis result 312*a*. In the same manner, the evaluation result 350*b* for the analysis result 312*b* is derived as a result inferred by predicting whether a human expert will accept or reject the analysis result 312*b*. The analysis results 312*a* and 312*b* may be results of the segmentation of an airway of a lung performed by the first artificial neural network 310. As shown in FIG. 3, the second artificial neural network 320 of the present invention may learn the evaluation result of a user, who is a human expert, for an analysis result obtained by applying the first artificial neural network 310 to a medical image, i.e., at least one of image segmentation, the detection of a lesion in an image, the clinical diagnosis of a detected lesion, and the measurement of a segmented region of interest in advance, and may predict and infer an evaluation result of the user, who is a human expert, when a new input is given.

In this case, the processor may provide the user with a menu adapted to recommend the user to manually acquire an analysis result rejected by the second artificial neural network 320.

Although the embodiment in which the evaluation results 350*a* and 350*b* are marked as Accept or Reject is shown in FIG. 3, this follows the format of evaluation results used for learning. In contrast, when expert evaluation results used for learning are based on scores, the evaluation results of the second artificial neural network 320 may be provided in the form of scores.

Figure 4:
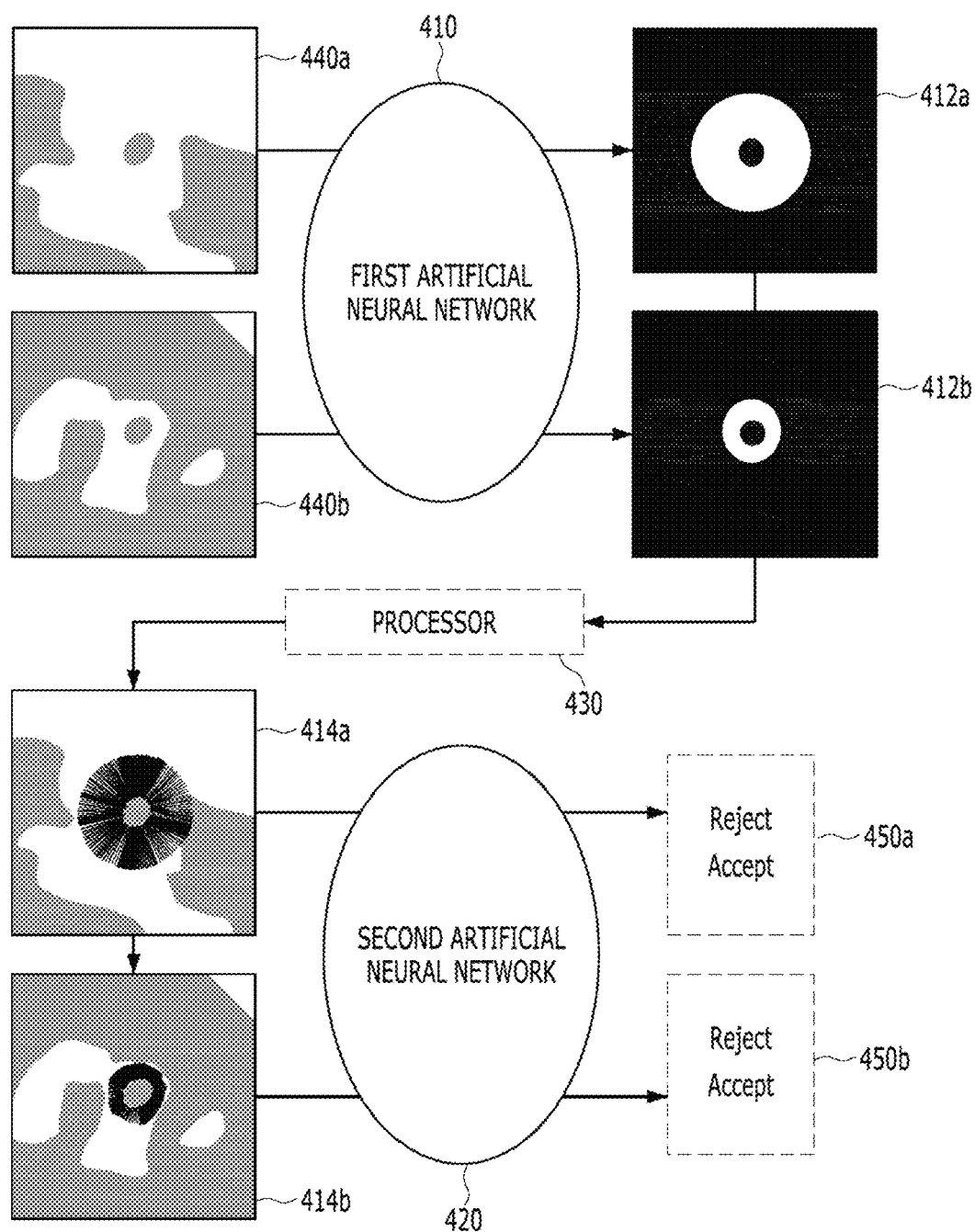
FIG. 4 is a diagram showing an artificial neural network-based medical image analysis process according to an embodiment of the present invention.

FIG. 4 is a diagram showing an artificial neural network-based medical image analysis process according to an embodiment of the present invention.

Referring to FIG. 4, original medical images 440*a* and 440*b* may be input to a first artificial neural network 410, and airway wall images segmented from the original medical images 440*a* and 440*b* may be acquired as analysis results 412*a* and 412*b*. The processor 430 may provide the analysis results 412*a* and 412*b*, i.e., the segmented airway wall images, as inputs to a second artificial neural network 420 without change. However, in the embodiment of FIG. 4, representative visualization forms 414*a* and 414*b* may be generated by overlaying the analysis results 412*a* and 412*b* on the original medical images 440*a* and 440*b* so that a user who is a human expert can perform determination, and the representative visualization forms 414*a* and 414*b* may be provided as inputs to the second artificial neural network 420.

In this case, the original medical images 440*a* and 440*b* may be CT slice sets, and the representative visualization forms 414*a* and 414*b* may be 3D volume rendering images or multi-planar reformation (MPR) images. In other words, the original medical images 440*a* and 440*b* are not necessarily combined with the analysis results 412*a* and 412*b* without change. After display options, such as the view of the original medical images 440*a* and 440*b*, the direction of the view, and zoom, have been adjusted by considering visualization options used by the user who is a human expert, the adjusted original medical images 440*a* and 440*b* are combined with the analysis results 412*a* and 412*b* to form the representative visualization forms 414*a* and 414*b*.

As described above, although the evaluation results 450*a* and 450*b* may be provided as pseudo-decision-making results such as Reject or Accept, they may be provided in the form of decision-making scores.

Figure 5:
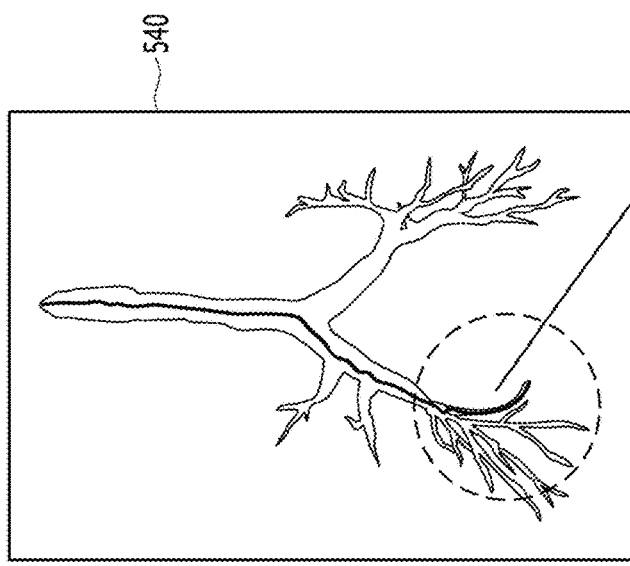
FIG. 5 is a view showing an artificial neural network-based medical image analysis process according to an embodiment of the present invention.

FIG. 5 is a view showing an artificial neural network-based medical image analysis process according to an embodiment of the present invention.

When the parameter that the computing system finally desires to acquire is airway measurement and it is desirable to quantify the wall thickness of a single airway branch, the computing system may evaluate the airway segmentation analysis results, derived by the first artificial neural network, using the second artificial neural network, may quantify a wall thickness using only the segmentation result judged to be acceptable, and may set the quantified wall thickness as the representative value of the airway branch.

Referring to FIG. 5, an object to be analyzed is shown by an image 540. The first artificial neural network may not be able to complete overall analysis on its own. In the embodiment of FIG. 5, the results of airway segmentation performed by the first artificial neural network at 10 airway branch locations shown in the image 540 are provided as analysis results 550.

In FIG. 5, there is shown the embodiment in which the second artificial neural network accepts 5 of the 10 analysis results 550 (airway segmentation results in this case) and rejects 5 of 10 analysis results 550. In this case, the processor may quantify the representative value of the wall thickness of the branch using only the accepted airway segmentation results through a subsequent operation.

The quantified representative value may be provided as the representative value of the wall thickness of the airway branch in airway measurement, which is a parameter to be finally determined.

According to the embodiment of the present invention disclosed in FIG. 5, when intermediate results for the generation of a final result requested by the computing system to be finally provided are acquired by the first artificial neural network, the second artificial neural network may select only analysis results accepted through evaluation or having an evaluation score higher than a predetermined reference value from the analysis results acquired by the first artificial neural network, and may designate the selected analysis results as the intermediate results for the generation of the final result.

The computing system and the processor may generate the final result by performing a subsequent operation on the selected intermediate results, and may provide it in response to a request from the user.

Figure 6:
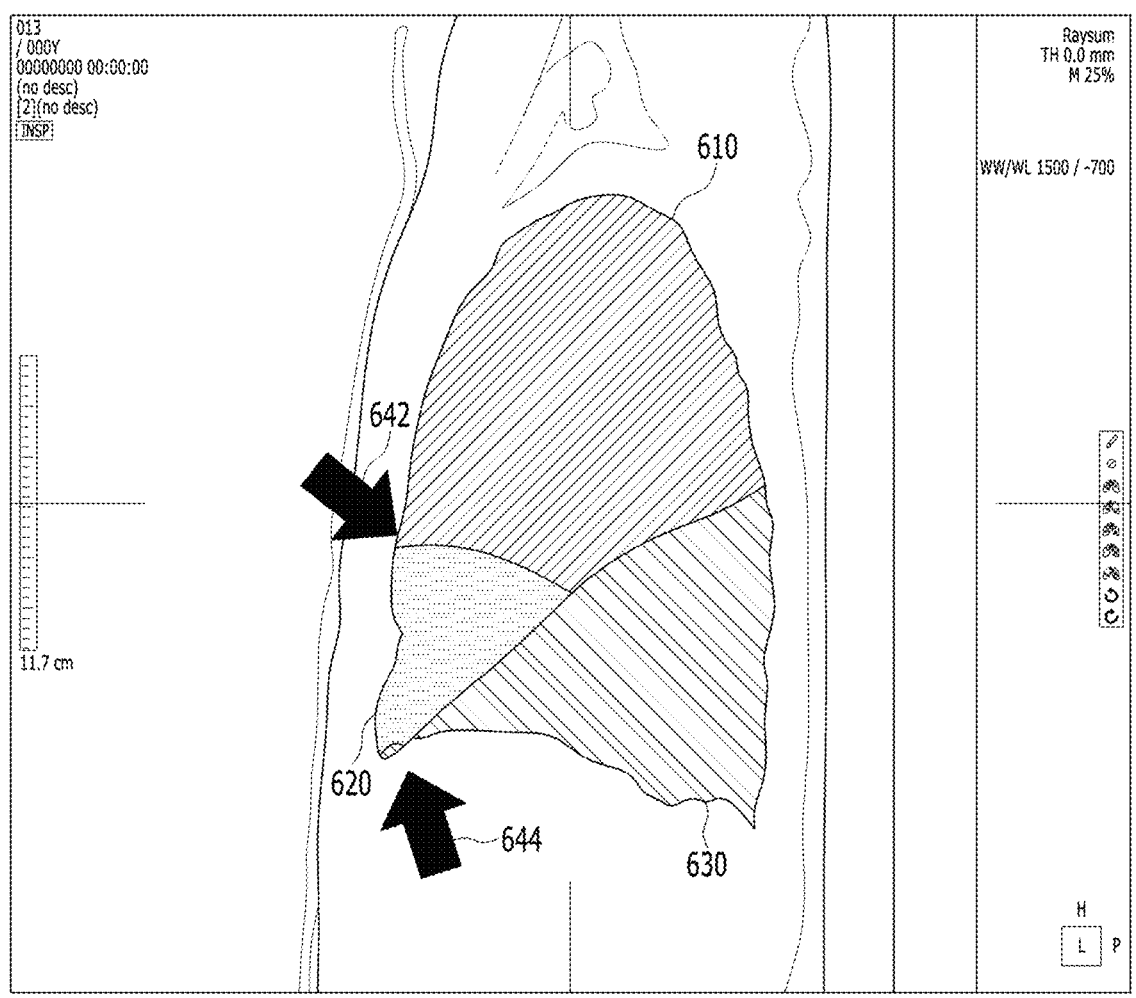
FIG. 6 is a view showing a process of generating input to an artificial neural network common to an artificial neural network-based medical image analysis process and a medical artificial neural network training process according to an embodiment of the present invention.

FIG. 6 is a view showing a process of generating input to an artificial neural network common to an artificial neural network-based medical image analysis process and a medical artificial neural network training process according to an embodiment of the present invention.

In general, it is known that a left lung is divided into an upper lobe (a superior lobe) 610 and a lower lobe (an inferior lobe) 630 and a right lung includes a middle lobe 620 between the upper lobe 610 and the lower lobe 630.

FIG. 6 is a view showing the results of lobe segmentation on a right lung image performed by the first artificial neural network.

According to the commonly known lobe segmentation technology, the result of segmentation for each lobe is output in the form of a mask. Accordingly, the analysis results of the first artificial neural network are not provided in the form shown in FIG. 6, but are given in the form of a segmented mask for each lobe.

However, to check whether the lobe segmentation has been correctly performed, users who are a plurality of human experts will evaluate the validity of the lobe segmentation results by overlaying masks for the respective lobes on a medical image in which the lungs are shown. The processor of the present invention analyzes the visualization options of these users. Accordingly, when the analysis results of the first artificial neural network are given as the masks for the respective lobes, the processor may generate the image of FIG. 6 by overlaying the masks for the respective lobes on the lung image, and may provide the image of FIG. 6 as an input to the second artificial neural network.

In this case, if it is determined that the users chiefly use a sagittal image of the lungs to evaluate the lobe segmentation results, the processor may generate an image to be provided as an input to the second artificial neural network by overlaying the masks for the respective lobes on the sagittal image of the lungs.

Furthermore, a single lobe segmentation result is represented throughout a 3D space. Accordingly, if, as a result of the tracking of the visualization options of the users for the evaluation of lobe segmentation results, it is determined that a plurality of sagittal images rather than a single sagittal image is more frequently used, the processor may generate a plurality of input images by overlaying the masks for the respective lobes, i.e., the analysis results of the first artificial neural network, on the plurality of sagittal images, and may provide the plurality of input images to the second artificial neural network as input.

Referring to FIG. 6, it is found that the upper lobe 610 and the middle lobe 620 overlap each other at the point indicated by the tip of the arrow 642. Furthermore, it is also found that the middle lobe 620 and the lower lobe 630 overlap each other at the point indicated by the tip of the arrow 644. Although the overlap between the masks for those respective lobes is wrong in the strict sense, it may be accepted by experts if the overlap does not have a clinically significant error.

The second artificial neural network is trained by providing information about whether experts accept analysis results or evaluation scores as input to the second artificial neural network, and the second artificial neural network learns to imitate expert evaluation results.

When a new lobe segmentation result is provided by the first artificial neural network, the processor may generate at least one overlaid image such, as that shown in FIG. 6, may provide it as an input to the second artificial neural network, and may control the second artificial neural network so that the second artificial neural network can derive an evaluation result for the new lobe segmentation result of the first artificial neural network.

Figure 7:
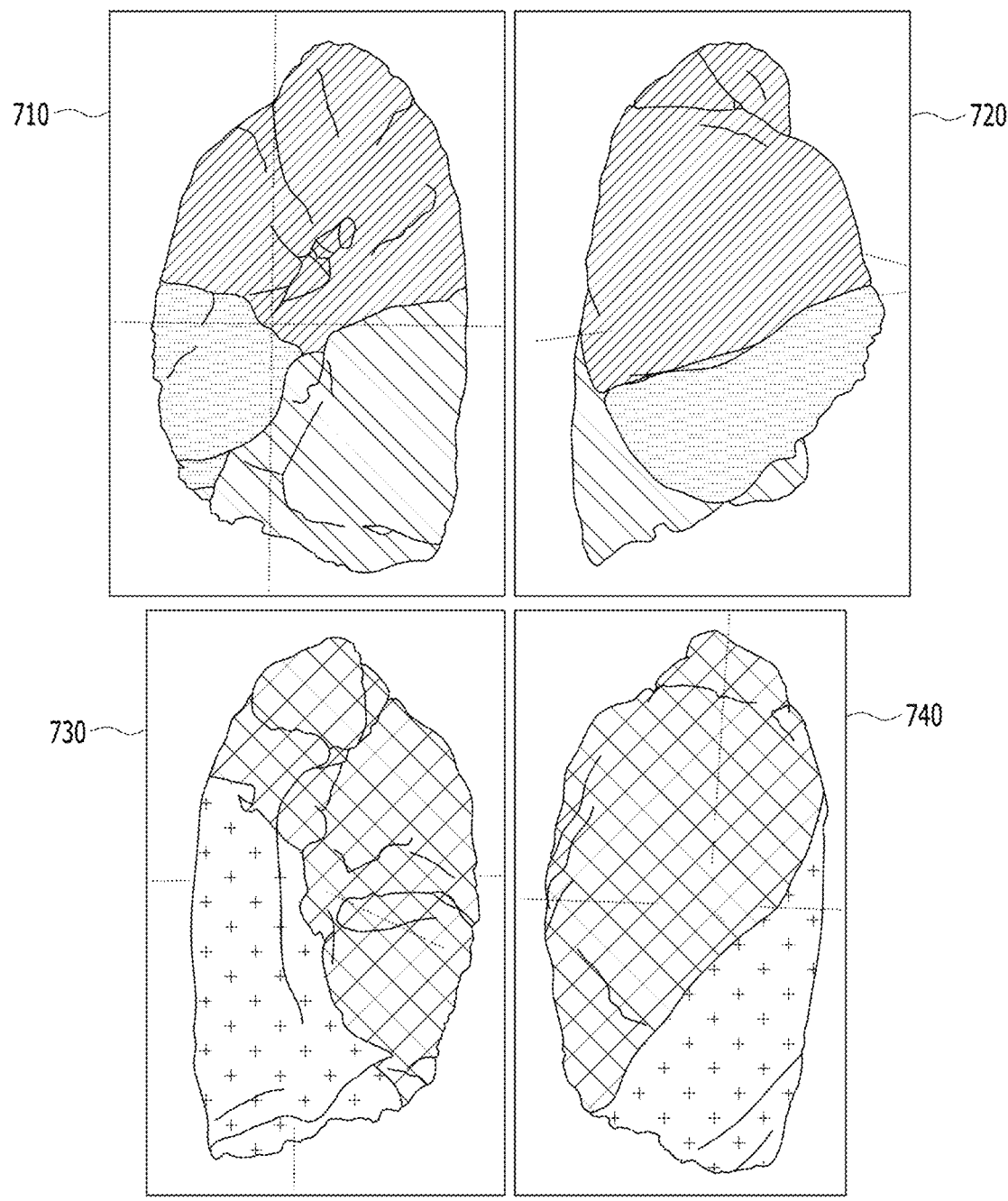
FIG. 7 illustrates views showing the process of generating input to an artificial neural network according to an embodiment of the present invention.

FIG. 7 illustrates views showing the process of generating input to an artificial neural network according to an embodiment of the present invention.

Although whether masks for respective lobes overlap each other may be effectively recognized in a sagittal image, whether there is an area that is not covered with any of the masks for the respective lobes may be more effectively recognized in a 3D volume rendering image.

In FIG. 7, there are shown first and second images 710 and 720 in which masks for respective lobes are overlaid on a 3D volume rendering image of the right lung and third and fourth images 730 and 740 in which masks for respective lobes are overlaid on a 3D volume rendering image of the left lung.

The first and second images 710 and 720 are images of the 3D volume rendering and overlay results of the same right lung viewed from different viewpoints, and the third and fourth images 730 and 740 are images of 3D volume rendering and overlay results of the same left lung viewed from different viewpoints.

Figure 8:
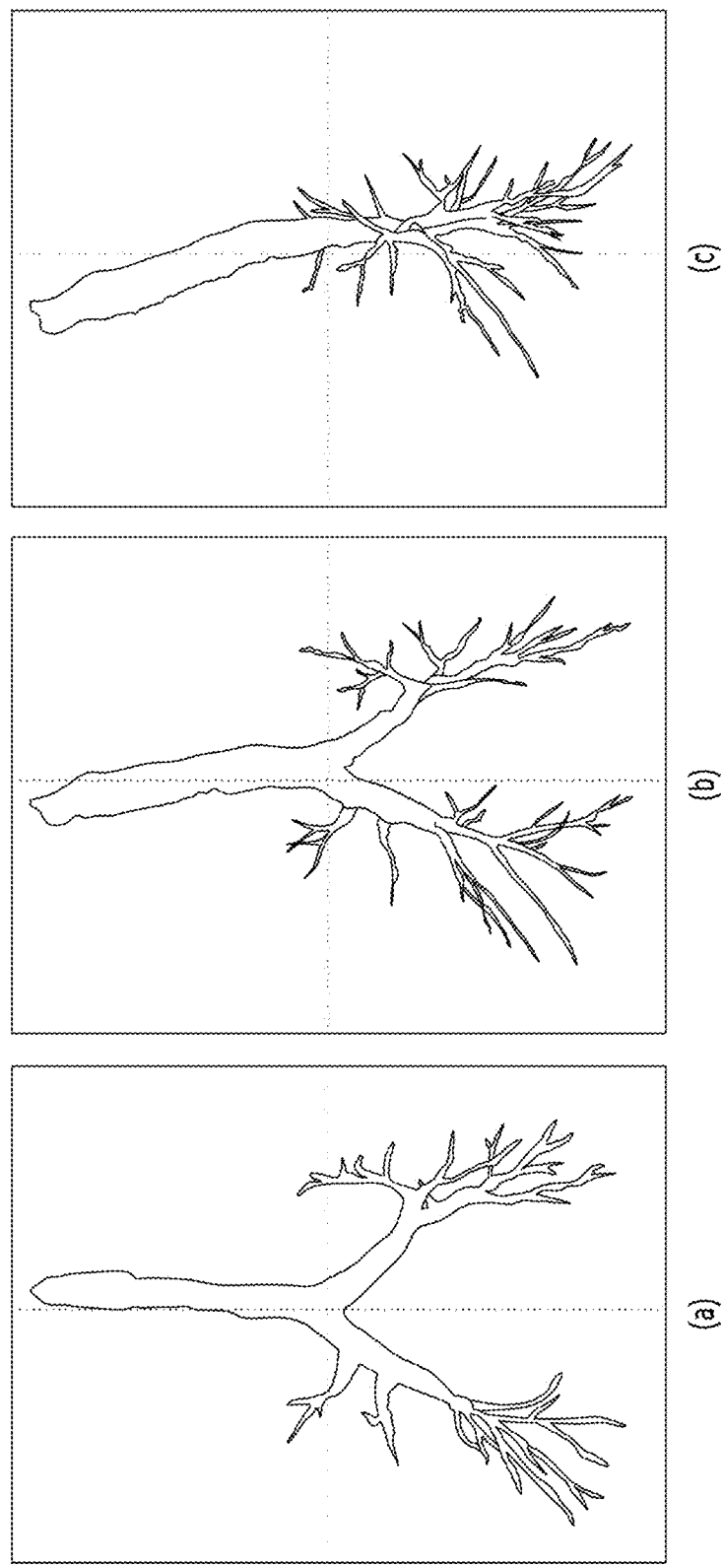
FIG. 8 illustrates views showing the process of generating input to an artificial neural network according to an embodiment of the present invention.

FIG. 8 illustrates views showing the process of generating input to an artificial neural network according to an embodiment of the present invention.

In FIGS. 8(a), 8(b) and 8(c), there are illustrated views showing 3D volume rendering images of airway segmentation results output by the first artificial neural network when viewed from different viewpoints. The images of FIGS. 8(a), 8(b) and 8(c) are images viewed from different viewpoints, respectively.

An MPR image overlaid with an airway mask is also widely used as a visualization option for the evaluation of an airway segmentation result. However, if an airway is too thin to accurately identify whether it is segmented, a 3D volume rendering image showing the segmented portion of the airway, such as those shown in FIG. 8, may be provided as an input to the second artificial neural network.

In an embodiment of the present invention, the processor may also provide an MPR image (not shown) obtained by overlaying 3D volume rendering images, viewed from a plurality of viewpoints as shown in FIG. 8, and masks for respective lobes on one MPR image as an input to the second artificial neural network, and may control the second artificial neural network so that the second artificial neural network can output evaluation for an airway segmentation result of the first artificial neural network.

Figure 9:
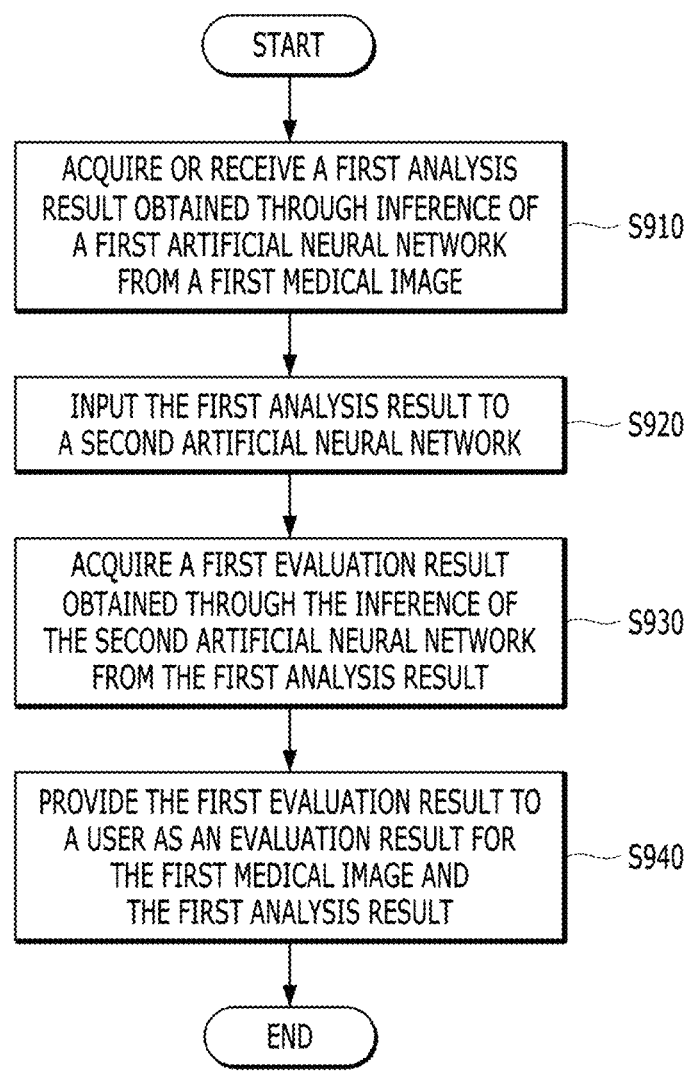
FIG. 9 is an operation flowchart showing an artificial neural network-based medical image analysis method that is performed by an artificial neural network-based medical image analysis apparatus (system) according to an embodiment of the present invention.

FIG. 9 is an operation flowchart showing an artificial neural network-based medical image analysis method that is performed by an artificial neural network-based medical image analysis apparatus (system) according to an embodiment of the present invention.

Referring to FIGS. 1 and 9 together, the artificial neural network-based medical image analysis method that is performed by the computing system 100 according to the present embodiment includes: step S910 of acquiring or receiving the first analysis result 112 obtained through the inference of the first artificial neural network 110 from the first medical image 140; step S920 of inputting the first analysis result 112 to the second artificial neural network 120; step S930 of acquiring the first evaluation result 150 obtained through the inference of the second artificial neural network 120 from the first analysis result 112; and step S940 of providing the first evaluation result 150 to a user as an evaluation result for the first medical image 140 and the first analysis result 112.

In this case, the method according to the present invention may include the step of offering a suggestion about whether to accept the first analysis result 112 to the user based on the first evaluation result 150.

Meanwhile, step S930 of acquiring the first evaluation result 150 obtained through the inference of the second artificial neural network 120 from the first analysis result 112 may include: a step in which the second artificial neural network 120 extracts contextual information about the first analysis result 112; and a step in which the second artificial neural network 120 outputs the first evaluation result 150 evaluating the first analysis result 112 based on the contextual information through inference.

The method according to the present embodiment may further include: the step of visualizing the first analysis result 112 into a representative visualization form according to predetermined rules; and the step of providing the first analysis result 112, visualized into the representative visualization form, as an input to the second artificial neural network 120.

Meanwhile, step S920 of inputting the first analysis result 112 to the second artificial neural network 120 may include the step of inputting both the first medical image 140 and the first analysis result 112 to the second artificial neural network 120 (see the input 114), and step S930 of acquiring the first evaluation result 150 obtained through the inference of the second artificial neural network 120 from the first analysis result 112 may include a step in which the second artificial neural network 120 extracts contextual information about the first medical image 140 and a step in which the second artificial neural network 120 outputs the first analysis result 112 evaluating the first evaluation result 150 for the first medical image 140 based on the contextual information through inference.

Furthermore, the method according to the present embodiment may further include the step of displaying heatmap information based on internal parameters of the second artificial neural network 120 outputting the first evaluation result 150 by overlaying the heatmap information on the first medical image 140 or first analysis result 112, and the step of providing the heatmap information to the user as descriptive information about a process in which the second artificial neural network 120 outputs the first evaluation result 150.

Figure 10:
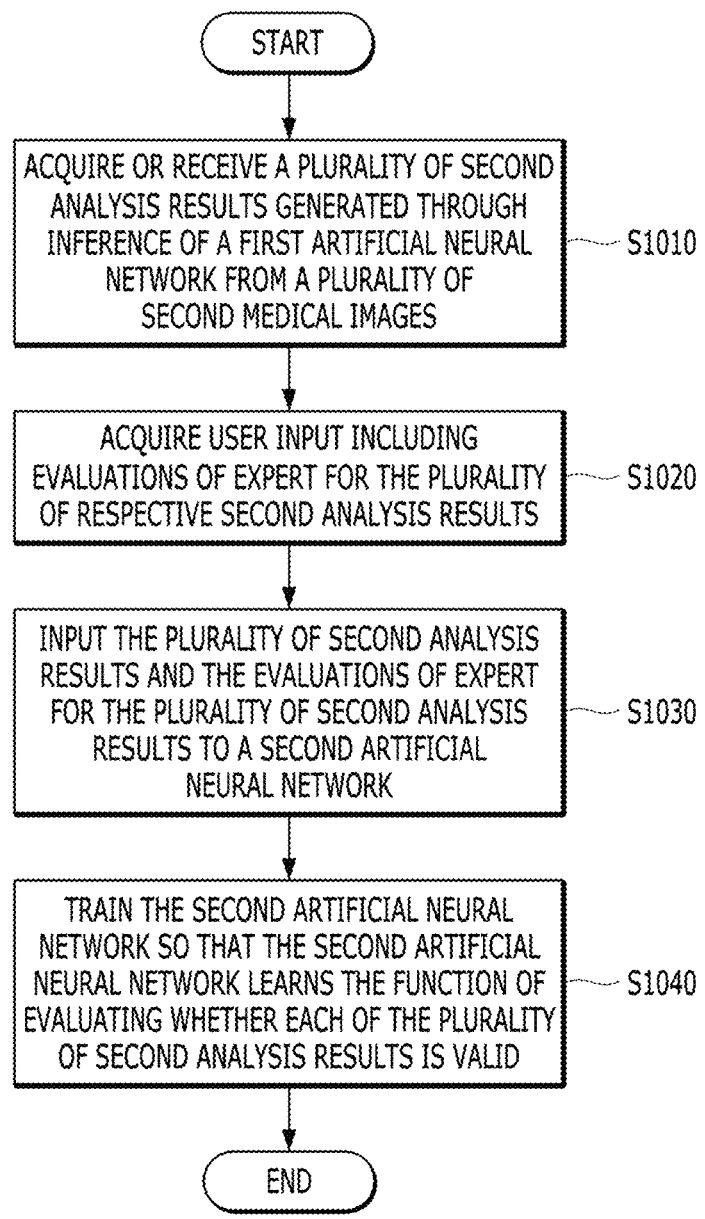
FIG. 10 is an operation flowchart of a training method for a medical artificial neural network that is performed by a training apparatus (system) for a medical artificial neural network according to an embodiment of the present invention.

FIG. 10 is an operation flowchart of a training method for a medical artificial neural network that is performed by a training apparatus (system) for a medical artificial neural network according to an embodiment of the present invention.

Referring to FIG. 10, the training method for a medical artificial neural network that is performed by a computing system 200 according to the present embodiment includes: step S1010 of acquiring or receiving a plurality of second analysis results 212 generated through the inference of a first artificial neural network 210 from a plurality of second medical images 240; step S1020 of acquiring user input including expert evaluations 216 for the plurality of respective second analysis results 212; step S1030 of inputting the plurality of second analysis results 212 and the expert evaluations 216 for the plurality of second analysis results 212 to the second artificial neural network 220; and step S1040 of training the second artificial neural network 220 so that the second artificial neural network 220 learns the function of evaluating whether each of the plurality of second analysis results 212 is valid.

In this case, step S1040 of training the second artificial neural network 220 may include: the step of extracting, by the second artificial neural network 220, contextual information about each of the plurality of second analysis results 212; and the step of training the second artificial neural network 220 so that the second artificial neural network 220 learns correlations between the plurality of second analysis results 212 and the expert evaluations 216 for the plurality of respective second analysis results 212 based on the contextual information.

Step S1030 of inputting the plurality of second analysis results 212 and the expert evaluations 216 for the plurality of second analysis results 212 to the second artificial neural network 220 includes inputting the plurality of second medical images 240, the second analysis results 212, and the expert evaluations 216 for the plurality of respective second analysis results 212 to the second artificial neural network 220 (see an input 214).

Step S1040 of training the second artificial neural network 220 may include: the step of extracting, by the second artificial neural network 220, contextual information for each of the plurality of second medical images 240; and the step of training the second artificial neural network 220 so that the second artificial neural network 220 learns correlations between the second analysis results 212 for the plurality of respective second medical images 240 and the expert evaluations 216 for the plurality of respective second analysis results 212 based on the contextual information.

The training method according to the present embodiment may further include: the step of generating heatmap information based on internal parameters of the second artificial neural network 220 in a training process for the learning of each of the plurality of second analysis results 212; the step of displaying the heatmap information by overlaying the heatmap information on each of the plurality of second medical images 240 or each of the plurality of second analysis results 212; and the step of providing the heatmap information to a user as descriptive information about the training process of the second artificial neural network 220.

The method according to an embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

According to the present invention, an evaluation result of a human expert for an automatic analysis result of an artificial neural network may be predicted in advance. According to the present invention, whether an automatic analysis result of a first artificial neural network is valid may be predicted through the inference of a second artificial neural network from the automatic analysis result of the first artificial neural network and predicted information about whether the automatic analysis result is valid is provided, thereby improving the accuracy of a medical image analysis result finally adopted by a user.

The learning of the second artificial neural network may be performed based on an automatic analysis result of the first artificial neural network and expert evaluation for the automatic analysis result of the first artificial neural network. According to the present invention, the evaluation of the second artificial neural network as to whether the automatic analysis result of the first artificial neural network is useful may be learned using a representative visualization form used when a human expert evaluates the automatic analysis result of the first artificial neural network. Accordingly, the learning of the second artificial neural network is performed in an environment closer to the visualization form interpretable by a human expert than the prior arts, and an evaluation result closer to that of a human expert may be acquired than the prior arts.

Furthermore, the second artificial neural network of the present invention may be enhanced by using a deep neural network or the like, and an evaluation factor that is difficult to discover with the unaided eye of a human expert is discovered, and thus whether an automatic analysis result of the first artificial neural network is valid may be more accurately evaluated.

An evaluation result of the second artificial neural network of the present invention for an automatic analysis result of the first artificial neural network is acquired through training that simulates a method by which a human expert interprets the automatic analysis result of the first artificial neural network, and may thus be understood as descriptive information about the automatic analysis result of the first artificial neural network from the point of view of a human.

Furthermore, according to the present invention, an evaluation result of the second artificial neural network for an automatic analysis result of the first artificial neural network may provide information on the clinical usefulness of the automatic analysis result of the first artificial neural network. In this case, a user may acquire information on the clinical usefulness of the first artificial neural network, and may provide information on clinical usefulness to the first artificial neural network as feedback, thereby contributing to further advancing and improving the first artificial neural network in the future. In other words, the descriptive information provided by the present invention may be usefully used to improve the performance of automatic medical image analysis algorithms based on artificial neural networks, such as the first artificial neural network.

However, the present invention is not limited to the embodiments. Like reference symbols in the drawings designate like components. The lengths, heights, sizes, widths, etc. introduced in the embodiments and drawings of the present invention may be exaggerated to help to understand.

Although the present invention has been described with reference to specific details such as the specific components, and the limited embodiments and drawings, these are provided merely to help a general understanding of the present invention, and the present invention is not limited thereto. Furthermore, those having ordinary skill in the technical field to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

What is claimed is:

1. An artificial neural network-based image analysis apparatus for analyzing an image based on an artificial neural network, the artificial neural network-based image analysis apparatus comprising a computing system, the computing system comprising at least one processor, wherein the at least one processor is configured to:
   acquire or receive a first result obtained through an inference of a first artificial neural network from a first image;
   input the first result to a second artificial neural network;
   acquire a second result obtained through an inference of the second artificial neural network from the first result, wherein the second result includes a determination based on whether the first result would be accepted; and
   provide the second result to a user as a determination result of the first result with regard to the first image.

2. The artificial neural network-based image analysis apparatus of claim 1, wherein the at least one processor is further configured to offer a suggestion about whether to accept the first result to the user based on the second result.

3. The artificial neural network-based image analysis apparatus of claim 1, wherein the second artificial neural network is an artificial neural network that has learned a function of determining whether each of the plurality of second analysis results is acceptable by receiving expert evaluations for a plurality of second analysis results generated through inferences of the first artificial neural network from a plurality of second images.

4. The artificial neural network-based image analysis apparatus of claim 1, wherein the first artificial neural network provides at least one of an object detection in the first image, an object segmentation for the first image, a classification based on the first image, a prediction based on the for the first image, or a quantification regarding at least one object identified in the first image as the first result.

5. The artificial neural network-based image analysis apparatus of claim 1, wherein the at least one processor is further configured to:
   control the second artificial neural network so that the second artificial neural network extracts contextual information about the first result; and
   control the second artificial neural network so that the second artificial neural network outputs the second result evaluating the first result based on the contextual information through an inference.

6. The artificial neural network-based image analysis apparatus of claim 1, wherein the at least one processor is further configured to:
   input both the first image and the first result to the second artificial neural network;
   control the second artificial neural network so that the second artificial neural network extracts contextual information about the first image; and
   control the second artificial neural network so that the second artificial neural network outputs the second result evaluating the first result for the first image based on the contextual information through inference.

7. The artificial neural network-based image analysis apparatus of claim 1, wherein the at least one processor is further configured to:
   display heatmap information based on internal parameters of the second artificial neural network outputting the second result by overlaying the heatmap information on the first image or first result; and
   provide the heatmap information to the user as descriptive information about a process in which the second artificial neural network outputs the second result.

8. The artificial neural network-based image analysis apparatus of claim 1, wherein the at least one processor is further configured to:
   visualize the first result into a representative visualization form according to predetermined rules; and
   provide the first result, visualized into the representative visualization form, as an input to the second artificial neural network.

9. An artificial neural network-based medical image analysis apparatus for analyzing a medical image based on an artificial neural network, the artificial neural network-based medical image analysis apparatus comprising a computing system, the computing system comprising at least one processor, wherein the at least one processor is configured to:
   acquire or receive a first result obtained through an inference of a first artificial neural network from a first medical image;
   input the first result to a second artificial neural network;
   acquire a second result obtained through an inference of the second artificial neural network from the first result, wherein the second result includes a determination based on whether the first result would be accepted; and
   provide the second result to a user as a determination result of the first result with regard to the first medical image.

10. The artificial neural network-based medical image analysis apparatus of claim 9, wherein the at least one processor is further configured to offer a suggestion about whether to accept the first result to the user based on the second result.

11. The artificial neural network-based medical image analysis apparatus of claim 9, wherein the second artificial neural network is an artificial neural network that has learned a function of determining whether each of the plurality of second analysis results is acceptable by receiving expert evaluations for a plurality of second analysis results generated through inferences of the first artificial neural network from a plurality of second medical images.

12. The artificial neural network-based medical image analysis apparatus of claim 9, wherein the first artificial neural network provides at least one of an object detection in the first medical image, an image segmentation for the first medical image, a medical diagnosis based on the first medical image, and a quantification regarding at least one object identified in the first medical image as the first result.

13. An artificial neural network-based image analysis method, the artificial neural network-based image analysis method being performed by program instructions executed by a computing system, the artificial neural network-based image analysis method comprising:
   acquiring or receiving a first result obtained through an inference of a first artificial neural network from a first image;
   inputting the first result to a second artificial neural network;
   acquiring a second result obtained through an inference of the second artificial neural network from the first result, wherein the second result includes a determination based on whether the first result would be accepted; and
   providing the second result to a user as a determination result of the first result with regard to the first image.

14. The artificial neural network-based image analysis method of claim 13, further comprising offering a suggestion about whether to accept the first result to the user based on the second result.

15. The artificial neural network-based image analysis method of claim 13, wherein the acquiring a second result comprises:
   extracting, by the second artificial neural network, contextual information about the first result; and
   outputting, by the second artificial neural network, the second result evaluating the first result based on the contextual information through an inference.

16. The artificial neural network-based image analysis method of claim 13, further comprising:
   visualizing the first result into a representative visualization form according to predetermined rules; and
   providing the first result, visualized into the representative visualization form, as an input to the second artificial neural network.

* * * * *